United States Patent [19]

Habimana

[11] Patent Number: 6,048,819
[45] Date of Patent: Apr. 11, 2000

[54] CATALYST COMPOSITION

[75] Inventor: Jean Habimana, Barry, United Kingdom

[73] Assignee: Dow Corning, Ltd., Barry, United Kingdom

[21] Appl. No.: 09/216,208

[22] Filed: Dec. 18, 1998

[30] Foreign Application Priority Data

Dec. 24, 1997 [GB] United Kingdom ............. 9727136

[51] Int. Cl.$^7$ ............... B01J 27/24; B01J 27/14; B01J 27/138; B01J 31/00; C08G 77/06

[52] U.S. Cl. ............... 502/200; 502/208; 502/214; 502/226; 502/162; 502/167; 502/169; 502/172; 528/12; 528/23

[58] Field of Search ............... 502/200, 208, 502/214, 226, 162, 167, 169, 172; 528/12, 23

[56] References Cited

U.S. PATENT DOCUMENTS

| | | | |
|---|---|---|---|
| 3,549,680 | 12/1970 | Wegehaupt et al. | 260/448.2 |
| 3,839,388 | 10/1974 | Hitzsche et al. | 260/448.2 |
| 4,902,813 | 2/1990 | Wegehaupt et al. | 556/459 |
| 5,008,229 | 4/1991 | Schuster et al. | 502/167 |
| 5,210,129 | 5/1993 | Habimana et al. | 524/731 |
| 5,210,131 | 5/1993 | Gilson et al. | 524/863 |
| 5,380,902 | 1/1995 | Hager et al. | 556/462 |
| 5,408,025 | 4/1995 | Thompson et al. | 528/12 |
| 5,424,385 | 6/1995 | Hager et al. | 528/28 |
| 5,484,871 | 1/1996 | Stepp | 528/31 |
| 5,502,143 | 3/1996 | Oie et al. | 528/12 |
| 5,510,441 | 4/1996 | Razzano | 528/12 |
| 5,534,608 | 7/1996 | Thompson et al. | 528/12 |
| 5,919,883 | 7/1999 | Dittrich et al. | 528/15 |

FOREIGN PATENT DOCUMENTS

| | | | |
|---|---|---|---|
| 0 522 776 A1 | 1/1993 | European Pat. Off. | B01J 4/00 |
| 765744 | 1/1957 | United Kingdom . | |
| 910513 | 11/1962 | United Kingdom . | |
| 2 252 969 | 8/1992 | United Kingdom | C01B 21/098 |
| 2 252 975 | 8/1992 | United Kingdom | C08G 77/08 |

*Primary Examiner*—Elizabeth Wood
*Assistant Examiner*—Patricia L. Hailey
*Attorney, Agent, or Firm*—Melvin D. Fletcher

[57] ABSTRACT

A catalyst composition for use in the preparation of an organopolysiloxane comprises a γ-butyrolactone carrier and a phosphonitrile catalyst. Preferred phosphonitrile catalysts comprise $Cl_3PNPCl_2NPCl_3.PCl_6$, $(Cl_3P=N-(PCl_2=N)_d-PCl_3)^+(SbCl_6)^-$ wherein d is 1 to 4, and compounds of the formula $Y(PX_2=N)_aPX_2O$ wherein X is chlorine, hydroxyl or an organosilicon radical bonded to phosphorous via oxygen, and a is 1 to 5. Also disclosed is a method for producing an organopolysiloxane by polymerisation reaction in the presence of a said catalyst composition, and use of γ-butyrolactone as a carrier for a phosphonitrile catalyst in the preparation of an organopolysiloxane.

7 Claims, No Drawings

CATALYST COMPOSITION

The present invention relates to a catalyst composition, in particular a phosphonitrile catalyst-containing composition, a method for preparing organopolysiloxanes in the presence of such a composition and use of γ-butyrolactone as a carrier for such a catalyst.

Certain Phosphonitrile compounds are known in the art as catalysts for catalysing the production of organopolysiloxanes by polymerisation or copolymerisation. For example, GB patent specification 765 744 discloses the use of polymeric chlorides represented by the formula $(PNCl_2)_n$, wherein n is an integer of at least 3, most preferably 3 to 6, as preferred phosphonitrile halides for the polymerisation of liquid organosiloxanes having an average degree of substitution of from 1.9 to 2.1 organic groups attached to each silicon atom. This polymerisation reaction is described as especially valuable for the production of organosiloxanes for use in the manufacture of silicone rubber. GB patent specification 910 513 discloses phosphonitrile halide catalysts for use in a process for the manufacture of stabilised high viscosity organopolysiloxane oils. This process comprises preparing a fluid mixture of the catalyst with a hydroxy terminated diorganopolysiloxane and a triorganosilyl endblocked diorganopolysiloxane, followed by bringing the mixture into contact with a stream of air at room temperature and thereafter into contact with a stream of air at a temperature of from 100 to 200° C. until the viscosity of the mixture has stabilised. U.S. Pat. No. 3,549,680 discloses the use of phosphonitrile halide catalysts in rearrangement reactions, e.g. disclosed is a method of preparing organohalogenosilicon compounds in which organohalogenosiloxane compounds containing at least one halogen atom bonded to silicon per molecule and organosiloxanes free from halogen substituents having a viscosity of less than 100,000mm²/s are mixed with the phosphonitrile halide catalyst. EP patent specification 319 978 describes chlorophosphonitrile catalysts for use in a process for the preparation of diorganopolysiloxanes containing a silicon-bonded hydroxyl group in each of its terminal units, in which process a cyclic diorganopolysiloxane and/or diorganochlorosilane hydrolysis product is/are reacted with a diorganochlorosilane, followed by treatment with water or an aqueous solution and removal of low boiling substituents and the aqueous phase. More recently, GB patent specification 2,252,969A discloses phosphonitrile halide adducts as catalysts for polymerisation of organopolysiloxanes, which adducts have a cationic phosphonitrile part and an anionic part which has been derived from a Lewis acid, and GB patent specification 2,252,975 discloses a method for making organopolysiloxanes using these catalysts. U.S. Pat. No. 5,380,902 discloses a process for the condensation and/or equilibration of organosilicon compounds using oxygen-containing phosphazene catalysts, and U.S. Pat. No. 5,424,385 discloses oxygen-containing chlorophosphazenes containing organosilicon radicals as catalysts for such reactions.

Many phosphonitrile catalysts, in particular linear ionic phosphonitrile catalysts, are substantially insoluble in polysiloxane reaction mixtures and a carrier is thus required for delivery and/or dispersion thereinto. Typical carriers are chlorinated hydrocarbons, but the solubility of phosphonitrile compounds therein is limited, which can lead to precipitation of the catalyst from the carrier, and chlorinated solvents are no longer environmentally acceptable. There is thus a need for an alternative means for delivering phosphonitrile catalysts into polysiloxane reaction mixtures. U.S. Pat. No. 5,008,229 discloses phophonitrile halide catalysts which are prepared for delivery in halogen-free organic solvent, for example ethyl acetate containing solubilisers.

In addition, certain phosphonitrile catalysts require neutralising at the end of the polymerisation reaction in order to stabilise the polymer reaction product, for example to control the degree of polymerisation and hence the viscosity of the product. Neutralising agents for phosphonitrile catalysts are alkaline materials, typical examples of such neutralising agents being amines. However, when used with conventional chlorinated solvent carriers amine neutralising agents have a tendency to result in the polymer product turning an undesirable yellow colour on heating. Reduction of the concentration of amine in the reaction mixture can alleviate these effects but can also result in polymer products having very low heat stability.

The present invention can thus provide a catalyst composition for use in the production of organopolysiloxanes which avoids the use of environmentally harmful chlorinated hydrocarbons, and which can further afford heat stable, clear and low odour products in the presence of neutralising agents whilst showing comparable activity to that shown by catalyst compositions containing conventional carriers.

According to the present invention there is provided a catalyst composition for use in the preparation of organopolysiloxanes which comprises a γ-butyrolactone carrier and a phosphonitrile catalyst, preferably a phosphonitrile halide catalyst.

As used herein, the term phosphonitrile catalyst includes, for example, compounds having the following formulae:

  (I)

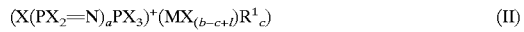  (II)

  (III)

wherein M is an element having an electronegativity of from 1.0 to 2.0 on Pauling's scale, $R^1$ is an alkyl group, a is an integer of from 1 to 9, b is the valence oxidation state of M, $0 \leq c < b$, X is a halogen atom, for example chlorine or bromine, and for the phosphonitrile catalysts of formula (III) each X may also be selected from hydroxyl groups, monovalent organic radicals, organosilicon radicals, optionally bonded to phosphorous via oxygen, and phosphorous containing radicals, and Y is a halogen, a hydroxyl radical or an organosilicon radical bonded to phosphorous via oxygen.

In formula (I) X is preferably chlorine and a is preferably 2 or 3.

In formula (II) X is preferably chlorine and a preferably has a value from 2 to 4, most preferably 2. M preferably has an electronegativity value according to Pauling's scale of from 1.2 to 1.9, most preferably 1.5 to 1.9, and suitable elements for M are found in Groups Ib, IIa, IIb, IIIa, IVa, IVb, Va, Vb. VIIb and VIII in the periodic table, e.g. Al, B, Be, Mg, Sb and Si. Example compounds include those having the formula $(Cl_3P=N-(PCl_2=N)_d-PCl_3)^+ (SbCl_6)^-$ wherein d has a value of from 1 to 4.

In formula (III) X is preferably chlorine, hydroxyl or an organosilicon radical bonded to phosphorous via oxygen, and a is preferably 1 to 5, more preferably 2 to 4. Preferred examples of compounds according to formula (III) include $PCl_3=N-PCl_2O$, $PCl_3=N-PCl_2=N-PCl_2O$, $PCl_3=N(-PCl_2=N)_2-PCl_2O$, $PCl_3=N(-PCl_2=N)_3-PCl_2O$, $HO-PCl_2=N-PCl_2O$, $HO-PCl_2=N-PCl_2=N-PCl_2O$, $HO-PCl_2=N(-PCl_2=N)_2-PCl_2O$ and $HO-PCl_2=N(-PCl_2=N)_3-PCl_2O$. When Y represents an organosilicon radical bonded to phosphorous via oxygen, said organosilicon radical preferably substantially consists of units of the formula $R_dX_eSiO_{(4-d-e)/2}$ in which each R is individually selected from a hydrogen atom or a monovalent organic radical, each X is preferably individually selected from a chlorine atom or a radical —$OR^2$ where $R^2$ is a monovalent organic radical, d is 0, 1, 2 or 3, e is 0, 1 or 2 with d+e<3. The monovalent organic radicals are preferably alkyl radicals having from 1 to 12 carbon atoms, most preferably methyl and ethyl radicals, and the organosilicon radicals preferably have a molecular weight of 300 to 30,000. Particularly preferred phosphonitrile compounds containing organosilicon radicals are those compounds of the formula $Cl(Me_2SiO)_fPCl_2=N(-PCl_2=N)_g-PCl_2O$ wherein f is an integer from 2 to 400, g is an integer from 1 to 3 and Me is a methyl radical.

The most preferred linear ionic phosphonitrile catalyst for use in the composition of the present invention is $Cl_3PNPCl_2NPCl_3^+ \cdot PCl_6^-$.

The phosphonitrile catalysts described above for use in the composition of the present invention and methods of preparing and using the same for polymerisation of organopolysiloxanes are well known in the art. Catalysts of formula (I) are described in U.S. Pat. No. 3,839,388, those of formula (II) in G.B. patent specification numbers 2,252,969, 2,252,975 and European patent specification number 0 522 776, and those of formula (III) in U.S. Pat. No. 5,380,902 and 5,424,385, the teachings of all of which references are incorporated herein by reference.

The composition of the present invention is prepared by dissolving the phosphonitrile catalyst in the γ-butyrolactone carrier. The saturation concentration of the catalyst in the γ-butyrolactone can be as high as 1000 grams per liter or more (exact figure dependent upon the particular catalyst used), much greater than the maximum saturation concentration in dichloromethane of 245 grams per liter. Thus, the use of γ-butyrolactone as the carrier in the present composition allows for preparation of a wider range of catalyst composition concentrations, for example from 1 gram of catalyst per litre of γ-butyrolactone to 1000 grams of catalyst per litre of γ-butyrolactone, than is available using conventional chlorinated hydrocarbon carriers.

According to the present invention there is also provided a method for producing an organopolysiloxane by polymerisation in the presence of a catalyst composition which comprises a γ-butyrolactone carrier and a phosphonitrile catalyst. As is well known in the art, phosphonitrile catalysts are useful for the polymerisation of organosiloxanes, particularly as condensation catalysts but also as rearrangement catalysts. The composition of the present invention is thus useful in a process for making organopolysiloxanes having units of the general formula $R^1_hSiO_{(4-h)/2}$ wherein each $R^1$ independently denotes a hydrogen atom, a hydrocarbon group having from 1 to 18 carbon atoms, a substituted hydrocarbon group having from 1 to 18 carbon atoms or a hydrocarbonoxy group having up to 18 carbon atoms and h has on average a value of from 1.8 to 2.2. R substituents may be alkyl, e.g. methyl, ethyl, propyl, isobutyl, hexyl, dodecyl or octadecyl, alkenyl, e.g. vinyl, allyl, butenyl, hexenyl or decenyl, alkynyl, e.g. propargyl, aryl, e.g. phenyl, aralkyl, e.g. benzyl, alkaryl, e.g. tolyl or xylyl, alkoxy, e.g. methoxy, ethoxy or butoxy, aryloxy, e.g. phenoxy, substituted groups, e.g. trifluoropropyl, chloropropyl or chlorophenyl. Preferably at least 80% of all R groups are alkyl or aryl groups, more preferably methyl groups. Most preferably substantially all R groups are alkyl or aryl groups, especially methyl groups. The organopolysiloxanes are preferably those in which the value of h is 2 for substantially all units, not including the endblocking units, and the siloxanes are substantially linear polymers of the general formula $R^2(R^1_2SiO)_iSiR^1_2R^2$ wherein R is as defined above, $R^2$ is a group $R^1$ or a hydroxyl group and i is an integer. However, a small number of units for which h is 0 or 1 may also be present, and polymers with such units in the chain would have a small amount of branching. Preferably R denotes a hydroxyl group or an alkyl or aryl group, e.g. methyl or phenyl. The viscosity of the organopolysiloxanes which may be produced using the present composition may be in the range of from approximately 1000 to many millions $mm^2/s$, depending on the reaction conditions and raw materials used. Suitable organosiloxanes for use as reagents in a polymerisation process in which the composition of the invention is used include polydiorganosiloxanes having terminal hydroxydiorganosiloxane units, e.g. hydroxydimethylsiloxane endblocked polydimethylsiloxanes, hydroxydimethyl endblocked polydimethylpolymethylphenylsiloxane copolymers, triorganosiloxane endblocked polydimethylsiloxanes, e.g. trimethylsiloxane endblocked polydimethylsiloxanes and cyclic polydiorganosiloxanes, e.g. polydimethylcyclosiloxanes. The use of phosphonitrile catalysts for catalysing organosiloxane polymerisation reactions is described in the documents mentioned above as being incorporated herein by reference.

The phosphonitrile catalyst is typically used at a concentration of from 1 to 500 ppm by weight based on the total weight of the organosiloxanes used as reagents in a polymerisation process. Preferably from 5 to 150 ppm by weight is used, most preferably from 5 to 50 ppm. The amount of catalyst used may be reduced when the temperature at which the organosilicon compounds and the catalyst are contacted is increased. The polymerisation reaction may conveniently be carried out at room temperature, but may also be as high as 250° C. Preferably the temperature range is from 20 to 150° C., most preferably from 50 to 120° C.

Catalyst compositions according to the invention may require neutralising at the end of the polymerisation reaction in order to stabilise the reaction product, e.g. in respect of its viscosity, particularly those catalyst compositions containing catalyst according to formula (I) or formula (II) above. Neutralisation may be done at any stage of the polymerisation process, e.g. as soon as the desired viscosity of the organopolysiloxanes is reached. Neutralisation agents for the catalysts are alkaline materials, preferably lightly alkaline materials. Examples of suitable neutralisation agents are diethylamine, propylamine, ammonia and hexamethyldisilazane.

The present invention will now be described in detail by way of example.

EXAMPLE 1

Reduction of Yellowing 100 grams of pre-prepared polydimethylsiloxane (viscosity 50,000 $mm^2/s$) was mixed with $2.0 \times 10^{-7}$ moles of phosphonitrile chloride antimonate catalyst and $10^{-6}$ moles of trihexylamine neutralising agent, firstly in the presence of $10^{-6}$ moles γ-butyrolactone and secondly in the absence of γ-butyrolactone. The resulting mixtures were heated at 150° C. for 5 days after which time the composition containing the γ-butyrolactone was completely colourless whereas the composition not containing the γ-butyrolactone was tinted yellow.

EXAMPLE 2

γ-butyrolactone vs. Dichloromethane as Carrier 5 grams of phosphonitrile chloride antimonate catalyst was dissolved in γ-butyrolactone and dichloromethane. Each solution was used to polymerise hydroxy end-blocked polydimethylsiloxane (100 mm²/s) at a catalyst concentration in the siloxane of 24 ppm. 2 ml of catalyst solution was used corresponding to 1.3×10⁻² moles of γ-butyrolactone per kg of siloxane. The polymerisation rates of the hydroxy end-blocked polydimethylsiloxane using the γ-butyrolactone and dichloromethane catalyst solutions were measured and the results shown in Table 1 below. FIG. 1 shows that the rates of polymerisation are very similar using the catalyst composition of the present invention compared to the dichloromethane solution, and hence that the activity of the phosphonitrile catalyst is not adversely effected by the use of γ-butyrolactione versus dichloromethane as carrier.

TABLE 1

|  | Intensity (mA) | | |
|---|---|---|---|
| Time (s) | 2792 III | 2792 CH₂Cl₂ | 9792 III |
| 0 | 1360 | 1355 | 1350 |
| 60 | 1370 | 1370 | 1330 |
| 120 | 1380 | 1380 | 1335 |
| 180 | 1385 | 1385 | 1360 |
| 195 | 1390 | 1390 | 1370 |
| 210 | 1420 | 1420 | 1415 |
| 220 | 1495 | 1495 | 1600 |
| 225 | 1600 | — | 1830 |
| 235 | 1960 | — | — |

That which is claimed is:

1. A catalyst composition for use in the preparation of an organopolysiloxane wherein the catalyst composition comprises a γ-butyrolactone carrier and a phosphonitrile catalyst.

2. A composition according to claim 1 wherein the phosphonitrile catalyst comprises a compound selected from the group consisting of compounds having the formula:

$(X(PX_2=N)_aPX_3)^+(PX_6)^-$, (I)

$(X(PX_2=N)_aPX_3)^+(MX_{(b-c+1)}R^1_c)^-$ (II), and $Y(PX_2=N)_aPX_2O$ (III)

wherein M is an element having an electroegativity of from 1.0 to 2.0 on Pauling's scale, $R^1$ is an alkyl group, a is an integer of from 1 to 9, b is the valence oxidation state of M, and $0 \leq c < b$, X is a halogen atom, and for the phosphonitrile catalysts of formula (III) each X may also be selected from the group consisting of hydroxyl groups, monovalent organic radicals, organosilicon radicals, organosilicon radicals bonded to phosphorous via oxygen, and phosphorous containing radicals, and Y is selected from the group consisting of a halogen, a hydroxyl radical and an organosilicon radical bonded to phosphorous via oxygen.

3. A composition according to claim 1 wherein the phosphonitrile catalyst comprises a compound of formula I wherein X is chlorine and a is 2 or 3.

4. A composition according to claim 1 wherein the phosphonitrile catalyst comprises a compound of the formula $(X(PX_2=N)_aPX_3)^+(MX_{(b-c+1)}R^1_c)^-$ wherein X is chlorine, a is an integer of from 2 to 5, and M is an element selected from the group consisting of Al, B, Be, Mg, Sb and Si.

5. A composition according to claim 4 wherein the phosphonitrile catalyst is a compound of the formula $(Cl_3P=N-(PCl_2=N)_d-PCl_3)^+(SbCl_6)^-$ wherein d has a value of from 1 to 4.

6. A composition according to claim 1 wherein the phosphonitrile catalyst is a compound of the formula $Y(PX_2=N)_aPX_2O$ wherein X is selected from the group consisting of chlorine, hydroxyl and an organosilicon radical bonded to phosphorous via oxygen, and a is 1 to 5.

7. A composition according to claim 6 wherein the phosphonitrile catalyst comprises a compound selected from the group consisting of $PCl_3=N-PCl_2O$, $PCl_3=N-PCl_2-N-PCl_2O$, $PCl_3=N(-PCl_2=N)_2-PCl_2O$, $PCl_3=N(-PCl_2=N)_3-PCl_2O$, $HO-PCl_2=N-PCl_2O$, $HO-PCl_2=N-PCl_2=N-PCl_2O$, $HO-PCl_2=N(-PCl_2=N)_2-PCl_2O$ and $HO-PCl_2=N(-PCl_2=N)_3-PCl_2O$.

* * * * *